Oct. 15, 1935. L. G. SIMJIAN 2,017,514
POSE REFLECTING BOOTH
Filed June 4, 1931  4 Sheets-Sheet 1
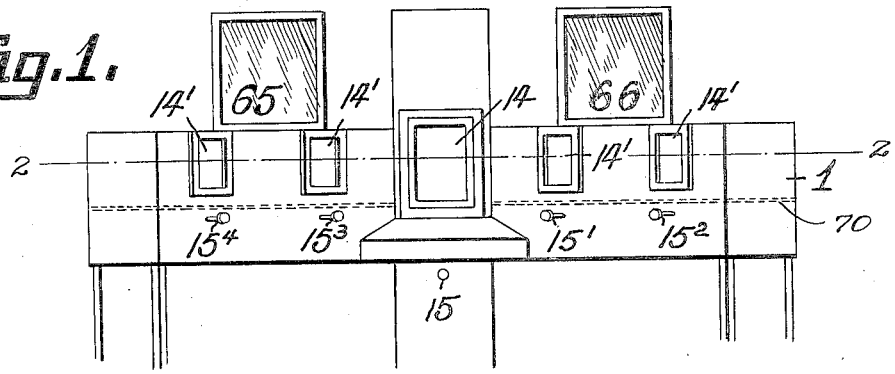
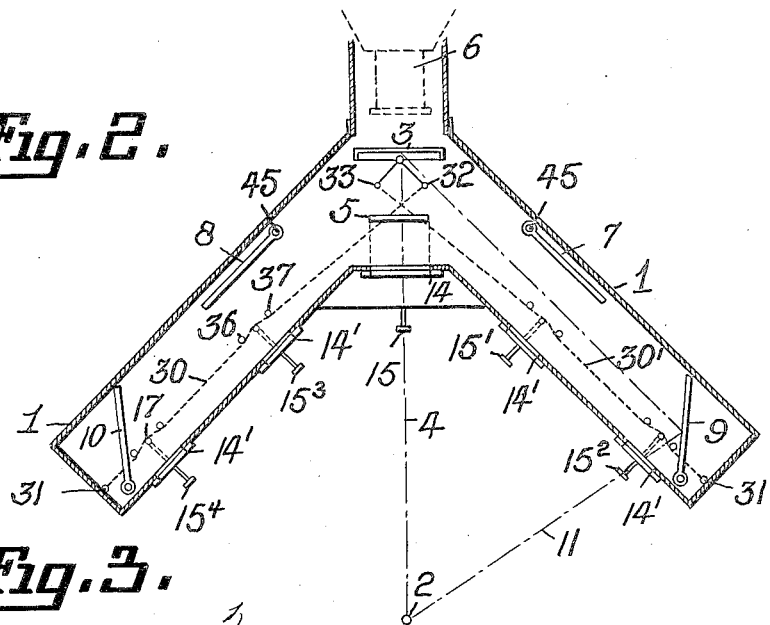
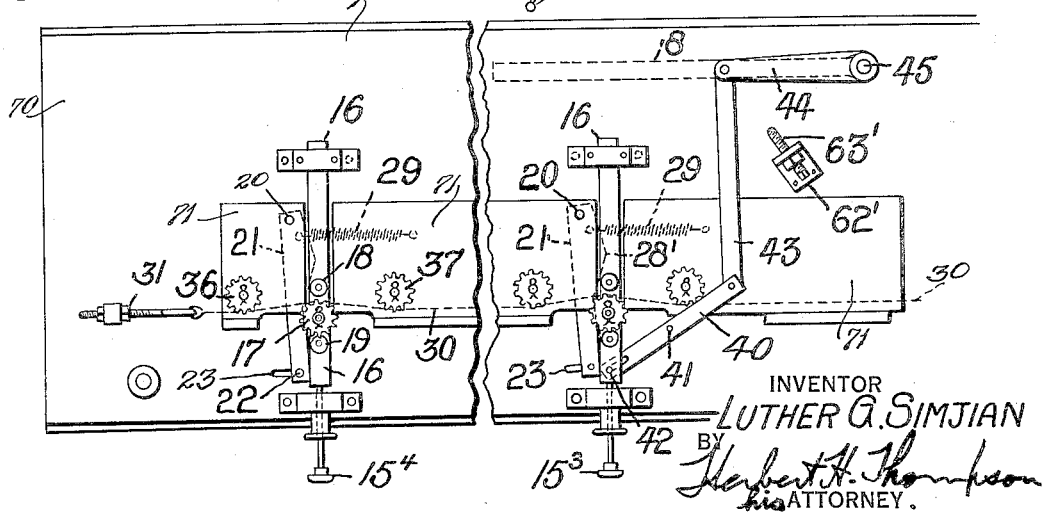

Oct. 15, 1935.   L. G. SIMJIAN   2,017,514
POSE REFLECTING BOOTH
Filed June 4, 1931   4 Sheets-Sheet 2

INVENTOR
LUTHER G. SIMJIAN
BY
Herbert H. Thompson
his ATTORNEY.

Oct. 15, 1935.  L. G. SIMJIAN  2,017,514

POSE REFLECTING BOOTH

Filed June 4, 1931  4 Sheets-Sheet 3

INVENTOR
LUTHER G. SIMJIAN.
BY Herbert H. Thompson
his ATTORNEY.

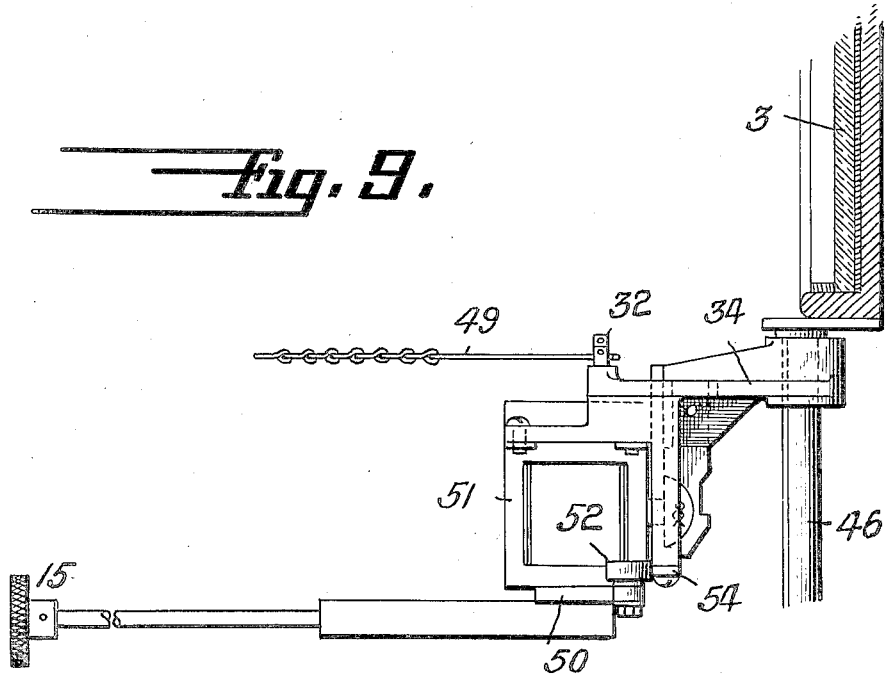
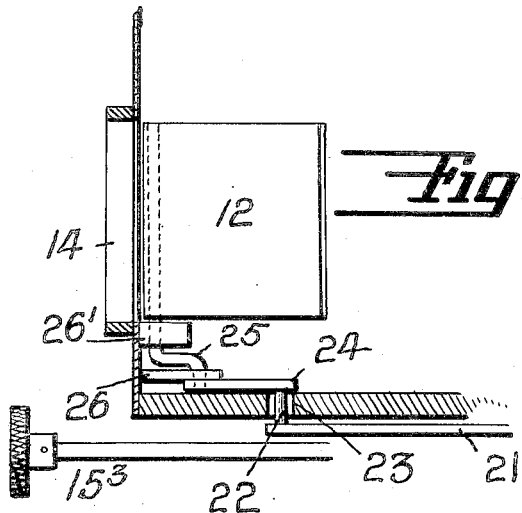

Patented Oct. 15, 1935

2,017,514

UNITED STATES PATENT OFFICE 2,017,514

POSE REFLECTING BOOTH

Luther G. Simjian, New Haven, Conn.

Application June 4, 1931, Serial No. 542,070

16 Claims. (Cl. 88—74)

This invention relates to pose reflecting systems or apparatus particularly adapted for self-photography. In such apparatus it is highly desirable that the poser be able to obtain a view of his face from several different angles, such as a full face view, semi-profile, and full profile from each side. If a system of mirrors is provided whereby the poser may see a number of views at the same time he becomes confused and does not know which pose he is photographing. Also a plurality of exposed mirrors seriously interferes with correct photographic effects since undesirable side lights may be caused thereby. One purpose of the present invention is to provide an apparatus in which the poser may see only the view which is actually being photographed and in in which all other mirrors are concealed.

The invention further provides means whereby any selected mirror and/or the other mirrors, if necessary, are placed in the proper position for the poser to see his face from the angle from which the photograph will be taken. Preferably such means is so constructed that the act of opening the shutters before the selected mirror automatically effects the mirror positioning also.

Other objects and improvements achieved by the invention will become apparent as the description proceeds.

Referring to the drawings showing several different forms the invention may assume, Fig. 1 is a front elevation of the upper portion of a pose reflecting booth designed to reflect a number of poses of the subject.

Fig. 2 is a transverse sectional view through the housing showing the reflecting mirrors and the operating mechanism in diagrammatic form on line 2—2 of Fig. 1.

Fig. 3 is a bottom view of the mechanism underneath the floor of the box structure enclosing the mirrors and which operates the mirrors and shutter mechanisms.

Fig. 8 is a detailed sectional view taken on line 8—8 of Fig. 4, showing the shutter operating mechanism.

Fig. 9 is a side elevation, partly in section, of the mirror and its operating mechanism, as shown in Fig. 7.

Figure 4:
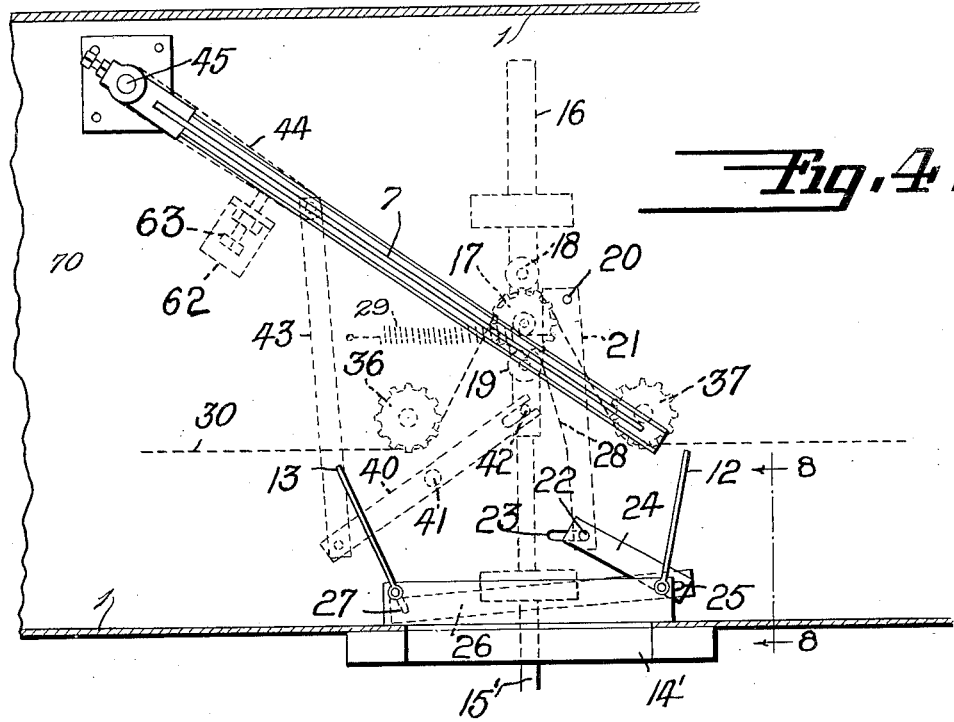
Fig. 4 is a plan view, partly in section of one of the pivoted mirrors showing the mechanism for operating the same in dotted lines and also the shutters.

As above stated, I prefer to provide a plurality of pose reflecting mirrors so that the poser may obtain a number of different views and select the one or ones he prefers. For this purpose I provide a housing 1 of angular shape, the poser sitting in a central position 2. The full face mirror 3, I place at the apex of the angle so that the poser may look directly forward along the dotted line 4 through window 14 and obtain a direct reflection of his face. If desired an image reducing lens 5 may be provided between the poser and the mirror. A camera 6 may be located in the back of the mirror 3 or in any convenient location, the present apparatus being well adapted to the system of self-photography described and claimed in prior Letters Patent No. 1,709,598 dated April 16, 1929 or to similar systems in which the mirror is dropped from in front of the camera lens when the picture is taken. Lamp boxes 65—66 with ground glass front doors may be provided for securing the proper lighting effects on the poser.

For obtaining profile and/or semi-profile views I provide additional mirrors 7—8 and preferably also 9 and 10, with a window 14' for each mirror. The last named pair of mirrors may be fixed at the proper angle so that when the poser looks into mirror 9, for instance, along the line 11 he will see his profile as reflected from the mirror 3 if the latter is turned to the proper angle at that time, the image reducing lens 5 functioning as before. Since the mirrors 7 and 8, on the other hand, lie between the mirrors 9 and 10 respectively and the mirror 3, it is desirable to provide means for maintaining them out of the line of sight when not in use as shown in Fig. 2. It is also highly desirable that the poser see only the image which he is photographing at the time and that all the other mirrors be concealed. For this purpose I provide shutters 12—13 which normally lie between each of the profile mirrors and the poser across the adjacent window 14' in the box 1. No shutter is needed for window 14 because mirror 3 is used in all poses.

I then provide a selective means for opening the shutters in front of the mirror selected and simultaneously closing any other that may be open and preferably also simultaneously arranging the mirrors in the proper position for the poser to see the view selected. For this purpose I provide adjacent each window a selector button 15, 15¹, 15², 15³ and 15⁴, which may be pressed inwardly when it is desired to use the adjacent mirror. Each of buttons 15¹, 15², 15³ and 15⁴ is connected at its inner end to a slide 16 slidably mounted on floor board 70 and having pivoted thereon a sprocket wheel 17 and a pair of cam rollers 18—19. Adjacent the slide is pivoted a cam lever 21 at 20 between said floor and a multiple, spaced plate 71, said lever having a pin 22 near its lower end guided in a slot 23 in the base and on which is pivoted a link 24 (Fig. 4). Link 24 at its outer end is connected to a crank arm 25 on the shutter 12. Also connected to said crank arm is connecting link 26 which is connected at its other end to a corresponding crank arm 27 on the shutter 13. The cam lever 21 is yieldingly held with its cam surface 28 against the roller 18 as shown in Fig. 3 in which position the shutters are closed. When, however, the button 15³ is pushed inwardly, the cam rollers riding up on the cam surface rotate cam plate or lever 21 clockwise in Fig. 3 (counter-clockwise in Fig. 4). This pushes the pin 22 outwardly in the slot 23, thus pushing link 24 to the right and downwardly (Fig. 4). This, it will be seen, rotates the shutter 12 clockwise to open the same as shown in Fig. 4 and the shutter 13 counter-clockwise to likewise open it. Both shutters are then maintained open by the fact that the upper roller 18 has passed the high point 28' on the cam surface. The button, therefore, has to be actually pulled outwardly before the shutters can close, although when the roller passes the said high point the remainder of the closing operation is effected by spring 29 and the shutters yieldingly maintained closed.

Figure 6:
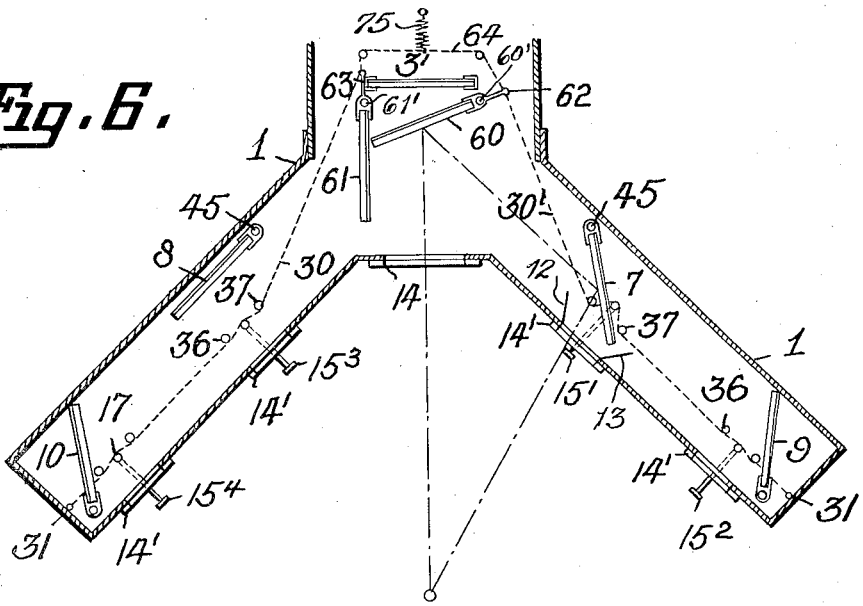
Fig. 6 is another view similar to Fig. 2 and showing a still further modification.

This mechanism may also operate the positioning means for the mirrors so that, as the selected pair of shutters opens, the mirrors will be automatically positioned in the proper position to obtain the right pose. For this purpose there is shown a sprocket chain or other flexible band 30, 30' running through each side of the box from anchor points 31 to opposite points 32, 33 on bracket arms 34 secured to the full face mirror. Each chain passes over the sprocket 17 and under sprocket wheels 36, 37 at each window, the chain between these wheels, being nearly straight when the buttons 15 etc. are pulled outwardly, as shown in Fig. 3. When, however, one of the side buttons is pushed inwardly as shown in Figs. 4 and 6, the length of chain between 36 and 37 is greatly increased by the inward movement of the sprocket 17. This has the effect of pulling the end 32 or 33 of the chain toward the pushed in button, which operation rotates the mirror 3 toward the aforesaid button. At the same time, the tension on the chain takes up the slack that may be present at any open window and closes the shutter at that window by pushing the button out. The two chains, in that they are connected at their centers through a common bell crank 34, form in effect a continuous chain or band in which the operation of opening a shutter at any one point closes the shutters at all other points.

As above explained, it is also desirable that the intermediate mirrors 7—8 be moved out of the way except when in use. Preferably this mechanism is also operated from the same push buttons 15¹ to 15⁴. To effect this purpose I have shown a lever 40 pivoted at 41, and having a pin and fork connection 42 at one end, with the bar 16 and being pivoted at its other end to a link 43. Said link in turn is pivoted to a crank arm 44 secured to a shaft 45 of one of the mirrors, 7, 8. This mirror, therefore, is maintained in the position shown in Figs. 2 and 3 as long as the adjacent button is not pushed. When, however, the button 15³ is pushed in, as shown in Figs. 4 and 6, lever 40 is rotated to move the mirror to the proper angle to reflect a semi-profile view of the poser as reflected from the mirror 3, which at the same time will be turned towards said mirror by the above described chain. The proper positioning of mirrors 7 and 8 is determined for each by a stop 62' having an adjusting screw 63' which abuts against arm 44 when the mirror is at the proper angle.

Figure 7:
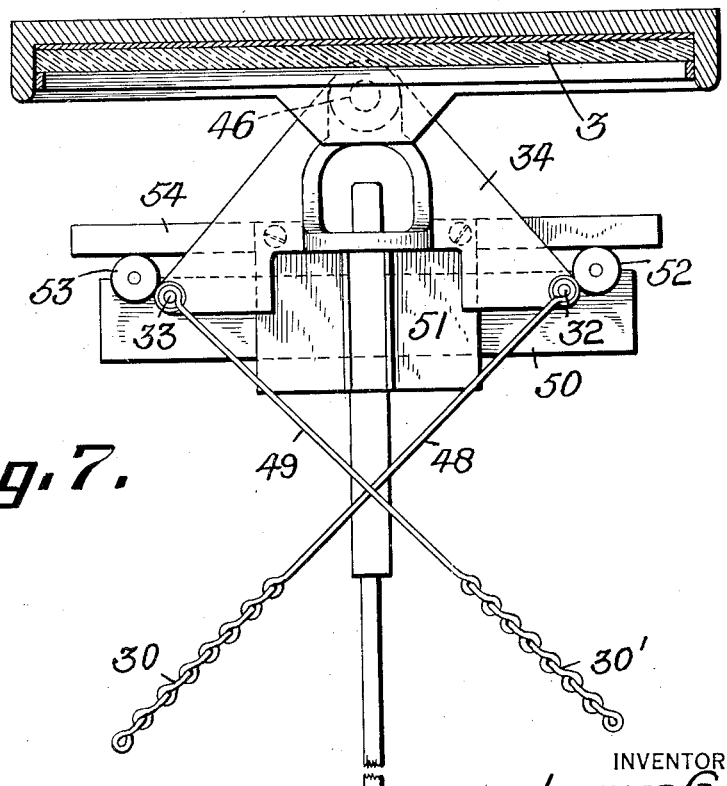
Fig. 7 is an enlarged detail showing the operating mechanism for turning the full face mirror of Figs. 2 and 5 when profile views are desired.

The preferred mounting of the full face mirror 15 is shown in Fig. 7. As shown, this mirror is mounted on a pivoted shaft 46, to one end of which is secured the aforementioned bracket 34. On each end of said bracket is secured the movable end of the respective links 48, 49, the links being crossed so that a pull on each chain will rotate the mirror in the direction of the pull. The central push button 15 for closing the shutters on the side windows 14', also acts to centralize the mirror 3 when it is pushed in so that a correct full face view may be obtained. For this purpose there is secured to the inner end of push button 15 a roller carriage 50 guided on a central fixed block 51 and having rollers 52—53 thereon which normally bear against a flat plate 54 secured to the bracket 34. It will readily be seen that if the mirror 3 should be in an inclined position and the button 15 pushed inwardly, that one of rollers 52—53 would come into contact with the forward side of the inclined plate 54, thus centralizing the plate and mirror. At the same time the slack will be taken up in the chains and any side shutter open at the time, closed.

Figure 5:
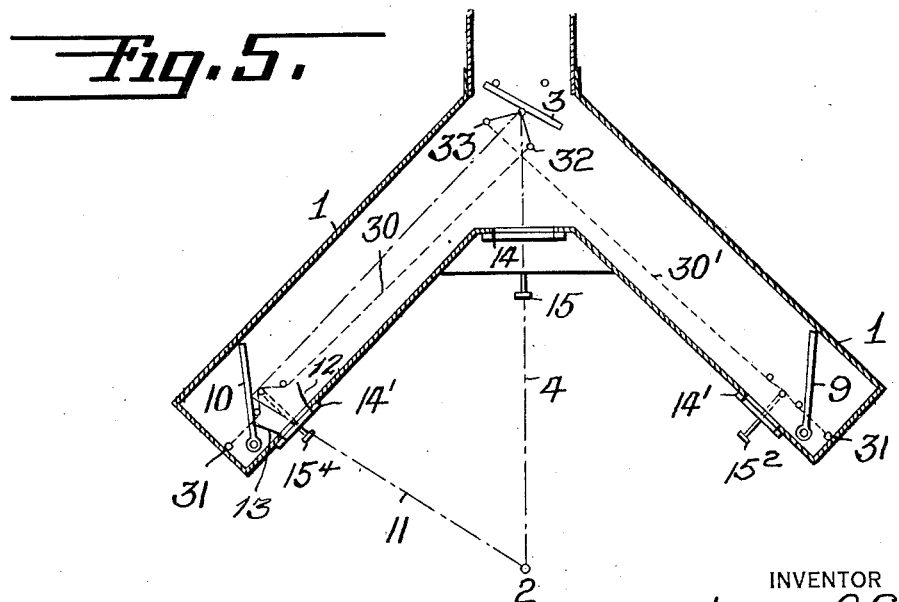
Fig. 5 is a view similar to Fig. 2 but showing a simplified form of the invention.

Fig. 5 shows a simplified form of device in which only one pair of profile mirrors is shown. In this form it is unnecessary to have the extra linkage for maintaining the intermediate mirrors in an inoperative position.

Fig. 6 shows still another modification in which a modified form of full face mirror is shown. In this figure, instead of using one mirror which is positionable at three different angles I employ a separate mirror for each angle, namely, full face mirror 3', a right profile mirror 60, and a left profile mirror 61 pivoted at 60' and 61', respectively. The full face mirror in this instance may be fixed while the aforementioned chains 30, 30' may be secured respectively to arms 62, 63 projecting from the back of mirrors 60, 61. In this instance the chains may be connected together to form a continuous chain 64, tension being maintained by spring 75. When all of the buttons are out, the two side mirrors are open and inoperative, the poser seeing his full face in the mirror 3'. When, however, the button 15¹, for instance, is pushed in, as shown in Fig. 6, the mirror 60 is rotated clockwise to the position shown and adjacent shutters opened so the poser then sees his half left profile. If button 15³ or 15⁴ should then be pushed in, mirror 60 would be rotated counter-clockwise to a perpendicular position and mirror 61 rotated counter-clockwise to the proper angle to reflect the profile of the poser. No central button is needed, since when buttons 15¹, 15², 15³ and 15⁴ are all out, mirrors 60 and 61 are out of the way and mirror 3' always remains operative.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a multi-pose reflecting apparatus, a mirror positioned in front of the poser, an angularly positioned mirror on either side of the poser and in which the poser may see his profile as reflected from said first named mirror to one of said angular mirrors, covering means for the angular mirrors, and means for uncovering a selected angular mirror and simultaneously covering the other angular mirror.

2. In a multi-pose reflecting photographic apparatus, an angularly adjustable mirror positioned in front of the poser, an angularly positioned mirror on either side of the poser and in which the poser may see his profile as reflected from said first named mirror to said angular mirror, covering means for the angular mirrors, and means operable by the poser for uncovering a selected angular mirror, simultaneously covering the other and turning said first named mirror to the proper position for the poser to see his image in the selected mirror.

3. In a multi-pose reflecting photographic apparatus, a full face mirror, means for turning the same, profile mirrors to either side thereof, shutter means for obscuring the profile mirrors, and manual means for opening the obscuring means of a selected mirror and closing all others, said means also operating to turn the first-named mirror to the proper angle for the poser to see himself in the selected mirror.

4. In a multi-pose reflecting photographic apparatus, a full face mirror, means for turning the same, a plurality of profile mirrors successively spaced to either side of said full face mirror, selective means adjacent each mirror, and means operable thereby and connected to the intermediate mirrors whereby intermediate profile mirrors are moved out of the line of sight between the outer profile mirrors and the full face mirror by the selective means for the outer profile mirrors.

5. In a multi-pose reflecting system, a central mirror for full face poses, a side mirror for double reflected profile poses, a pivotal mounting for said central mirror whereby it may be turned to provide the first reflection of said double reflected profile poses, and manual means for centralizing said central mirror adjacent said mirror comprising an angular member secured to said mirror, a push button slidably mounted in front of the same, and spaced means connected to said button to engage said angular member to centralize the mirror upon movement of said button.

6. In a multi-pose reflecting apparatus, a mirror positioned in front of the poser, an angularly positioned mirror on either side of the poser and in which the poser may see his profile as reflected from said first named mirror to said angular mirror, means for covering and uncovering the profile mirrors, and means adjacent each profile mirror for uncovering a selected mirror and simultaneously covering the other profile mirror.

7. In a multi-pose reflecting photographic apparatus, a full face mirror, means for turning the same, a plurality of profile mirrors successively spaced to either side of said full face mirror, selective means adjacent each mirror, and means operable by the selective means for each outer profile mirror and connected to the intermediate profile mirror whereby said intermediate profile mirror is moved into position and the full faced mirror simultaneously turned for double reflected profile poses.

8. In a multi-pose reflecting system, a main pose reflecting mirror, a profile pose reflecting mirror, a closure for the latter, means for opening said closure, and means adjacent the latter for turning the former to deflect the image therein to the latter and thence to the poser, said means also operating said opening means at the profile mirror.

9. In a multi-pose reflecting photographic apparatus, a full face mirror, means for turning the same, a plurality of profile mirrors successively spaced to either side of said first named mirror, selective means adjacent each mirror, means operable by the selective means for an outer profile mirror for moving the intermediate profile mirror out of the line of sight between the other mirrors, and means operable by the selective means for said intermediate mirror for placing it in the proper position to reflect the reflected image from the full face mirror when turned.

10. In a multi-pose reflecting apparatus, a mirror positioned in front of the poser, an angularly positioned mirror on a side of the poser and in which the poser may see his profile as reflected from said first named mirror to said angular mirror, a removable cover for said angular mirror, and a common means for removing said cover and for turning said first-named mirror to the proper angle for a double reflected side view.

11. In a multi-pose reflecting apparatus, a plurality of mirrors, a removable cover for each, and means for opening any selected cover comprising a band running past the mirrors, selective means for opening each cover, said band forming a connection between said selective means whereby opening of any cover closes all the others.

12. In a multi-pose reflecting apparatus, a plurality of mirrors, a removable cover for each, selective means for opening any cover, and a band interconnecting said selective means for closing the other covers as a selected cover is opened.

13. In a multi-pose reflecting apparatus, a plurality of rotatably mounted mirrors, a removable cover for each, selective means for opening any cover, and a band interconnecting said selective means for closing the other covers as a selected cover is opened and for also positioning said mirrors at the proper angle.

14. In a multi-pose reflecting apparatus, a rotatable mirror positioned in front of the poser, an angularly positioned mirror on a side of the poser and in which the poser may see his profile as reflected from said first named mirror to said angular mirror, means at the angular mirror for covering and uncovering the angular mirror, means at the front mirror for centralizing the same, and means interconnecting said last two means whereby opening said covering means turns said front mirror to give a double reflection and whereby operating said centralizing means closes said cover.

15. In a multi-pose reflecting apparatus, a plurality of mirrors including a front view mirror and obliquely positioned mirrors so that the subject may see a face view in the first-named mirror or either side view by looking in an oblique mirror and seeing his image by double reflection, movable covering means for concealing each oblique mirror not in use when the subject is observing his reflection in another mirror and separate means for operating each covering means.

16. In a multi-pose reflecting photographic apparatus, a plurality of mirrors including a front view mirror and obliquely positioned mirrors so that the subject may see a face view in the first-named mirror or either side view by looking in an oblique mirror and seeing his image by double reflection, movable covering means for each oblique mirror for concealing the same when not in use when the subject is observing his reflection in another mirror and a picture is being taken from that angle, separate means for opening each covering means, and means interconnecting said covering means for closing all other covering means when any of such means is opened.

LUTHER G. SIMJIAN.